Patented Dec. 9, 1941

2,265,864

UNITED STATES PATENT OFFICE 2,265,864

PROCESS FOR UTILIZATION OF
MANGANESE-IRON ORES

Percy H. Royster, Bethesda, Md.

No Drawing. Application October 13, 1938,
Serial No. 234,848

6 Claims. (Cl. 75—31)

This invention relates to an improved method of smelting oxidic ores or oxidic ore materials containing substantial amounts both of iron and of manganese (hereinafter referred to as "oxidic manganese-iron ores"), e. g., manganiferous iron ores or ferruginous manganese ores, or a product of the beneficiation of either containing more than about 3% of manganese oxide, whereby the iron is to a considerable extent separated, by a blast furnace smelting operation, from the manganese compounds of the ore, pig iron is produced and the major portion of the manganese is retained in the slag for subsequent conversion into manganese alloys. In particular the present invention relates to a method of treating such oxidic manganese-iron ores of types similar to those occurring in the Cuyuna Range of Minnesota, or a product of the beneficiation of the same, whereby the major portion of its iron content is converted into pig iron and the major portion of its manganese content is incorporated into the slag. By the expression "oxidic manganese-iron ores" I mean ores in which the metals manganese and iron are present as oxygen compounds.

In essence, the process of the present invention comprises feeding into a blast furnace a charge consisting essentially of the oxidic manganese-iron ore and a solid carbonaceous fuel (e. g., coke), in which charge the ratio of fuel to ore is below that conventional in pig iron practice and so low that the furnace could not continue to operate without a highly preheated blast; blowing the furnace with a highly heated blast; and controlling the temperature of the blast with relation to the supply of solid fuel so that the total heat supply (i. e., the sensible heat of the blast plus the heat derived from combustion of solid fuel) is sufficient to produce fluid pig iron containing the major portion of the iron content of the charge (which pig iron may contain some manganese) and a fluid slag containing the major part of the manganese content of the charge as oxide (and may contain a minor part of the iron content of the ore as iron oxide). The ratio of manganese to iron in said slag preferably is at least as high as 8 to 1.

It has been found that reduction of manganese oxide to manganese metal by means of carbon according to the equation $MnO+C=Mn+CO$ takes place at as low as 1,950° F. However, in the carrying out of this process there is normally produced a slag which at temperatures below 2,000° F. becomes too viscous to tap. The blast furnace, then, normally must be operated at a temperature not below 2,000° F.

The relative amount of manganese in the metal is determined by the equilibrium constant:

$$K = \frac{(MnO)(Fe)}{(Mn)(FeO)}$$

wherein the bracketed symbols (Fe) and (Mn) represent the "activity" or molar concentration of iron and manganese in molten pig iron respectively; and wherein (FeO) and (MnO) represent the same quantities for the iron oxide and manganese oxide in the slag.

As will be apparent, should the process be operated below the reduction temperature of MnO, "(Mn)" in the above term would be zero, and "K" would be infinity,—i. e., an impossibility unless "(Fe)" was, at the same time, zero, in which event no metallic iron would be produced. Accordingly, if equilibrium conditions are to be approached, the process of the invention is carried out at a temperature at which some reduction of manganese oxide positively does take place, and hence the pig iron product produced thereby contains some (e. g., 0.5% or 1.0% as a lower limit, up to, say, 3.5% or 4.0% as upper limit) of metallic manganese. This is particularly fortunate since, in a subsequent conversion of the pig iron product into steel the presence of manganese is of benefit for control of the sulphur content of the steel and for other reasons.

In carrying out the process of the invention I may for example charge into the blast furnace Cuyuna ore (or other oxidic manganese-iron ore) and coke, with no essential flux addition, in a ratio of ore to coke such that less than 1,800 pounds of coke are employed per long ton of pig iron produced, and blast the charge with air preheated sufficiently to prevent freezing in the furnace hearth. For this I have found that a blast temperature of 1,800° F. or above is desirable. The adjustment between the ore to coke ratio and the blast temperature preferably is so maintained that the total heat (i. e., the sum of the heat supplied by combustion of the coke plus the sensible heat of the blast) is low relative to the usual thermal requirements of the blast furnace as customarily operated, whereby the temperature of metal and slag are kept low, the temperature of reduction is kept low, and the amount of free energy available for the reaction $MnO+C=Mn+CO$ is small. I have found that by observing these conditions I am able to convert a major portion of the iron in the charge to metal, while only reducing a minor amount of the manganese oxide of the ore to a lower state of oxidation than MnO, the major amount of the total manganese of the ore entering the furnace being removed therefrom in the molten slag. This balance as between heat supplied by the blast and heat supplied by combustion of the fuel is so maintained that less than 25% of the manganese content of the ore (preferably, less than 10% of the manganese content of the ore) is converted to manganese metal in this furnacing operation and so that a slag containing above 20% of MnO is obtained.

The slag product is one having an unusually high content of manganese oxide: it is, in effect, an artificial manganese ore whose low iron content is the result of the beneficiation of an oxidic manganese-iron ore in a blast furnace by "selective reduction." As a manganese ore, its manganese content may be moderate and its contents of silica and of alumina may be higher than are usually encountered in high grade manganese ores normally used for ferromanganese production. Nevertheless, I have found that such slags can be employed, in a commercially feasible process, for the production of ferro-manganese of acceptable analysis.

The following example illustrates one mode of carrying out the process of the invention:

EXAMPLE

I charge into a blast furnace of approved design, having an 18 foot hearth diameter and a 22 foot bosh diameter, at twenty minute intervals, rounds or charges consisting of 29,180 lbs. of a Cuyuna ore, 7,175 lbs. of coke, and no limestone. The analyses of the ore and coke as charged are:

| 6,350 lbs./ton Ore | | 1,568 lbs./ton Coke | |
|---|---|---|---|
| Fe | 33.00 | Moisture | 1.50 |
| Mn | 11.56 | Volatile matter | 1.20 |
| P | 0.205 | Ash | 4.50 |
| $SiO_2$ | 8.1 | Fixed carbon | 92.80 |
| $Al_2O_3$ | 2.15 | S | 0.45 |
| CaO | 0.73 | Fe | 0.78 |
| MgO | 0.34 | $SiO_2$ | 2.19 |
| $CO_2$ | 0.41 | $Al_2O_3$ | 1.06 |
| Combined $H_2O$ | 7.89 | CaO | 0.28 |
| Moisture | 14.50 | Nitrogen | 0.35 |

I blow this furnace with 16,680 cubic feet per minute of air (measured at 60° F., 30 inches Hg pressure, 60% humidity) preheated to 1,900° F. In this operation I produce daily 330 long tons (of 2,240 lbs.) of pig iron and 250 long tons of slag. The analysis of the metal made is:

*Pig iron*

| | |
|---|---|
| Si | 0.18 |
| S | 0.08 |
| P | 0.59 |
| Mn | 1.75 |
| C | 3.92 |
| Fe | 93.48 | and the slag analysis is:

| | |
|---|---|
| $SiO_2$ | 31.70 |
| $Al_2O_3$ | 9.20 |
| CaO | 3.00 |
| MgO | 1.27 |
| FeO | 2.00 |
| MnO | 52.64 |
| S | 0.32 |
| $P_2O_5$ less than | 0.03 |
| Mn | 41.00 |
| Fe | 1.55 |
| P | 0.015 |

In this operation the furnace is supplied with so little total heat, from the combustion of fuel plus the sensible heat of the preheated blast, that the slag is tapped from the furnace at the temperature of 1,350° C. (2,462° F.) and below, the metal at 1,300° C. (2,372° F.) and below.

Expressed in molar concentrations, the above slag composition is three-fourths manganese silicate containing 63.85 molar percent manganese ortho silicate (tephroite) and 11.67 molar percent manganese meta-silicate (rhodonite) combined with 10.3% anorthite ($CaAl_2Si_2O_8$) and with smaller impurities of ferrous silicate ($FeSiO_3$), 5.32%, spinel ($MgAl_2O_4$), 6.02%, manganese sulphide (MnS), 1.92%, and aluminate ($MgAl_2O_4$), 0.92%.

I have found that in the ternary system rhodonite-tephroite-anorthite, the mixed silicates not only remain fluid at temperatures below 1,150° C., but their viscosities are low enough at these low temperatures to permit them to be used without flux in the hearth as blast furnace slags.

In this illustrated example, 41% of the total heat supply to the furnace appears in the form of sensible heat of the hot blast. In my process the heat of the blast functions as an essential factor in the operation and not as in prior blast furnace operations as a minor economy effecting the salvage of otherwise wasted heat. In all cases, I prefer that at least 35% to 40% of the total heat supply shall be hot blast.

This blast furnace operation differs from any operation with which I am familiar in that:

(1) The ratio of oxidic manganese iron ore to coke is in excess of any previous practice:

(2) There is no necessity for putting limestone or other flux into the charge.

(3) The blast temperature is higher than has been used heretofore;

(4) The temperature of the slag is lower than in any previous blast furnace practice;

(5) The slag is higher in MnO than any heretofore manufactured metallurgical slag;

(6) The CaO, MgO, and the ratio $$\frac{CaO+MgO}{SiO_2+Al_2O_3}$$

or "basicity," is lower than has ever been produced in blast furnace practice.

The primary chemical requirements in carrying out my process are (1) to reduce a large portion of the iron, keeping the FeO content of the slag low, and (2) to reduce a very small portion of the manganese, keeping the Mn content of the metal low. Under conditions of thermodynamic equilibrium, the attainment of both these objectives can be realized only when the temperature of reaction is low. In the reaction $$FeO+Mn \rightleftarrows Fe+MnO \qquad (1)$$

the change in free energy $\Delta F$ is given by the equation $$-RT \log_e (Fe)\cdot(MnO)/(FeO)(Mn) = \Delta H - T\Delta S \qquad (2)$$

where T is the absolute temperature of equilibrium (degrees Kelvin), $\log_e$ the natural logarithm, $\Delta H$ the change in "total heat" or enthalpy (calories per mol) and $\Delta S$ the change in entropy (entropy units, E. U. per mol).

It can be shown from the recent publications of Kelley (Bureau of Mines Bulletins No. 305, 1932, No. 374, 1934, No. 407, 1935, and No. 393, 1936) that $\Delta S$ for Equation 1 has the value —1.687 E. U./mol, and $\Delta H$ the value 25,640 calories/mol. Hence in the case of any slag and metal held in contact long enough for equilibrium to be reached, the values of (Fe), (Mn), (FeO) and (MnO) can be calculated from the equation $$\log_{10} (Fe)(MnO)/(FeO)(Mn) = 5,604/T - 0.369 \qquad (3)$$

Equation 3, although not in agreement with the 1920 experiments of Christianson & Hunter, has been verified experimentally and is believed to represent the chemistry of the reaction.

In the illustrated furnace operation given above, the molar concentration of FeO and MnO in the slag are (FeO) —0.01867 and (MnO) =0.500. In the accompanying metal (Fe)=0.812 and (Mn) =0.01552. The temperature T for equilibrium in this system calculated from Equation 3 is 1,596° K. or 1,323° C. The temperature of the effluent slag is 1,350° C. (or, 2,462° F.), the metal 1,300° C. (or, 2,372° F.) and the mean,—which approximates the temperature of the surface of contact between metal and slag,— is 1,325° C. (or 2,417° F.).

Chemically, the results at the low hearth temperature described in the specific example are satisfactory. The ratio of Mn-to-Fe in the slag is very high,—26.6 to 1. Of the Mn charged into the furnace, 94.69% is retained in the slag to be used in a second step for conversion to ferro-manganese.

In practical furnace operation it is frequently convenient to provide means for controlling variations which may arise from furnace irregularities. For this purpose, a reserve of a hundred or more degrees of "blast heat" is desirable. For example, the 1,900° F. hot blast temperature quoted in the above illustration refers to the average temperature employed. In practice I prefer to provide myself with blast heating equipment capable of providing, as circumstances may require, a considerable temperature reserve, and for heating the blast to these unusual temperatures I may and preferably do employ the blast heating equipment described in my U. S. Patent No. 1,940,371, issued December 19, 1933, which equipment, when constructed with such refractory materials as now are available on the market, is capable of delivering hot blast at temperatures as high as 2,400° F., or even 2,600° F.

It may be said that I operate the furnace with a "cold bottom" by a coke starvation, and keep the furnace "alive" by means of a highly overheated blast. I have found that a highly heated blast operates as an important "intensity factor" in the total heat of the furnace. I have also found that the stability of any furnace operations with such hot blast, even with low fuel consumption, is superior to operations with lower blast temperature and higher fuel consumption.

As the temperature of the hot blast is raised closer to the temperatures of slag and metal fluidity the hazard of the hearth freezing is largely avoided, and it can be seen that when the blast temperature is raised as high as 2,100° F. the metal and slag will remain fluid even in the temporary absence of any carbonaceous fuel whatever. I have found that if the blast temperature is 1,800–1,900° F., this 300° or 200° F. approach to the temperature of slag fluidity is sufficient to assure satisfactory operation in practice.

I claim:

1. Process which comprises charging oxidic manganese-iron ore and solid carbonaceous fuel into a blast furnace; blasting the charge with air preheated to a temperature of at least 1,800° F.; and adjusting the supply of solid carbonaceous fuel with respect to the sensible heat of the blast so that the total heat supply is insufficient to metallize the major portion of the manganese.

2. Process which comprises charging oxidic manganese-iron ore and solid carbonaceous fuel, without substantial flux addition, into a blast furnace; blasting the charge with air preheated to a temperature of at least 1,800° F.; and adjusting the supply of solid carbonaceous fuel with respect to the sensible heat of the blast so that the total heat supply is insufficient to metallize the major portion of the manganese.

3. Process of producing pig iron from oxidic manganese-iron ore, which comprises charging the ore and coke into a blast furnace in a ratio of ore to coke such that less than 1,800 pounds of coke are employed per long ton of pig iron produced; blasting the charge with air preheated sufficiently to prevent freezing of materials in the furnace hearth; and tapping from said furnace fluid pig iron containing not less than 0.5% nor more than 4.0% of manganese.

4. In the process of reducing oxidic manganese-iron ore in a blast furnace with the aid of coke for the production of a fluid pig iron product low in manganese and of a fluid slag containing in oxide form the greater part of the manganese content of the charge, the step which consists in blasting the charge with air preheated to a temperature not less than about 300° F. below the freezing point of the resulting slag and simultaneously so limiting the coke content of the charge as to make the total heat supplied thereby to the furnace hearth insufficient to reduce to metal more than a minor proportion of the manganese of the charge.

5. The process of metallizing iron and slagging manganese from oxidic manganese-iron ore in a blast furnace with the aid of a solid carbonaceous fuel, which comprises supplying at least 35% of the total heat supply necessary for producing molten pig iron and a molten slag as sensible heat of the blast.

6. In the blast furnace process of metallizing iron and slagging manganese from an oxidic manganese-iron ore containing substantial amounts both of iron and of manganese as oxygen compounds of the same, with the aid of solid carbonaceous fuel and under acid conditions of burdening, the improvement which consists in maintaining the ratio of fuel to ore at a value materially below that conventional in pig iron practice and too low to maintain liquidity of the contents of the furnace hearth without a highly preheated blast, while simultaneously providing the furnace, by means of a highly preheated blast, with sufficient supplemental heat of high intensity to maintain liquidity of the contents of the furnace hearth, the total heat supplied to the furnace from combustion of the fuel plus sensible heat of the blast being adjusted and maintained at a value sufficiently close to 2,400° F. to effect reduction of so much of the iron content but so little of the manganese content of the ore that the resulting primary slag contains manganese oxide and iron oxide in a ratio suitable for the production therefrom of ferro-manganese, with at least 20% of manganese oxide present in said primary slag.

PERCY H. ROYSTER.